(12) United States Patent
Nakagawa et al.

(10) Patent No.: US 7,540,807 B2
(45) Date of Patent: Jun. 2, 2009

(54) CONSTANT VELOCITY JOINT, MANUFACTURING METHOD OF CONSTANT VELOCITY JOINT AND JIG FOR ASSEMBLING CONSTANT VELOCITY JOINT

(75) Inventors: Eiji Nakagawa, Kariya (JP); Hiroyuki Kurono, Handa (JP); Akiyoshi Abiko, Anjo (JP); Yoshimi Aoki, Handa (JP); Yoshihiro Hanji, Toyoake (JP); Hideaki Hiramatsu, Hoi-gun (JP); Koji Hamajima, Chiryu (JP); Tadashi Nomura, Anjo (JP)

(73) Assignee: Jtekt Corporation, Osaka (JP)

( * ) Notice: Subject to any disclaimer, the term of this patent is extended or adjusted under 35 U.S.C. 154(b) by 0 days.

(21) Appl. No.: 11/287,295

(22) Filed: Nov. 28, 2005

(65) Prior Publication Data
US 2007/0243938 A1 Oct. 18, 2007

(30) Foreign Application Priority Data
Nov. 29, 2004 (JP) .............................. 2004-344177

(51) Int. Cl.
*F16D 3/205* (2006.01)

(52) U.S. Cl. ........................... 464/111; 464/905; 72/714

(58) Field of Classification Search ...................... 464/7, 464/11, 15, 111, 123, 124, 132, 905; 384/21, 384/55; 72/714
See application file for complete search history.

(56) References Cited

U.S. PATENT DOCUMENTS

| | | | | |
|---|---|---|---|---|
| 1,717,481 | A | * | 6/1929 | Warner ........................ 464/124 |
| 6,251,019 | B1 | * | 6/2001 | Hofmann et al. ............ 464/111 |
| 6,251,091 | B1 | | 6/2001 | Weston |

FOREIGN PATENT DOCUMENTS

| | | | | |
|---|---|---|---|---|
| FR | 2 600 730 | A1 | * 12/1987 | .................. 464/111 |
| JP | 4-73425 | A | * 3/1992 | .................. 464/111 |

* cited by examiner

*Primary Examiner*—Greg Binda
(74) *Attorney, Agent, or Firm*—Oblon, Spivak, McClelland, Maier & Neustadt, P.C.

(57) ABSTRACT

A constant velocity joint comprises an outer race, inner race and torque transmitting elements. The outer race has a cylindrical hollow part with an opening at one end and plural walls on an inner surface of the cylindrical hollow part. At the opening of the cylindrical hollow part, the walls have projections formed by a pin-drive. The inner race is assembled with the torque transmitting elements and press-fitted into the cylindrical hollow part of the outer race.

6 Claims, 10 Drawing Sheets

CONSTANT VELOCITY JOINT, MANUFACTURING METHOD OF CONSTANT VELOCITY JOINT AND JIG FOR ASSEMBLING CONSTANT VELOCITY JOINT

INCORPORATION BY REFERENCE

The present application claims priority under 35 U.S.C. §119 to Japanese Patent Application No. 2004-344177, filed on Nov. 29, 2004. The contents of that application are incorporated herein by reference in their entirety.

BACKGROUND OF THE INVENTION

1. Field of the Invention

This invention relates to a constant velocity joint, its manufacturing method and a jig for assembling the same.

2. Discussion of the Background

In a conventional tripod type constant velocity joint, a snap ring is mounted around an inner surface of an opening end of an outer race of the joint in order to avoid releasing an inner race arranged in the outer race from the opening. Becoming thinner, however, the outer race would not have enough thickness to be machined for a groove to mount the snap ring.

To resolve such problem, Japanese patent laid open No. 11-336782 and its equivalent of U.S. Pat. No. 6,251,019 disclose that the opening of the outer race partly forms projections which are plastically deformed as a restriction which prevents rollers of the inner race from being released from the opening. Specifically, the opening of the outer race is caulked by a chisel-like tool at tracks for the rollers. However, a large force is required for the caulking with the chisel-like tool at the tracks so that large manufacturing equipment is required. Further, for disassembling the constant velocity joint, each caulking has to be cut away from the opening. Thus the joint would not be dismantled substantially after it has been assembled.

SUMMARY OF THE INVENTION

In view of the foregoing, it is an object of the present invention to provide a constant velocity joint; whose projections for a restriction of release at an opening is able to be formed without a large force and; which is able to be dismantled even after it has been assembled. It is another object of the present invention to provide a manufacturing method of the constant velocity joint. It is further object of the present invention to provide a jig for assembling the constant velocity joint.

The present invention provides a constant velocity joint including an outer race, an inner race, torque transmitting elements and projections. The outer race has a cylindrical hollow part whose one end opens and whose inner surface has plural tracks. The inner race is disposed in the outer race to move angularly and longitudinally. The plural torque transmitting elements is disposed between the outer and inner race. The projections are plastically deformed by driving a pin beside the tracks at he opening end of the cylindrical hollow part.

The present invention also provides manufacturing method of a constant velocity joint, the method including following steps. Providing an inner race, and plural torque transmitting elements. Assembling an assembly with the inner race and the torque transmitting elements. Providing an outer race having a cylindrical hollow part whose one end opens and whose inner surface has plural tracks where the torque transmitting elements roll. Driving a pin besides the tracks at the opening end of the cylindrical hollow part so as to form projections which are plastically deformed internally. Inserting the assembly into the outer race so as to elastically deform the projection with the torque transmitting element.

The present invention further provides a jig for assembling a constant velocity joint. The jig includes a bore for being penetrated by a drive shaft connected with the inner race and an engaging portion for holding an assembly to be stable.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Figure 1:
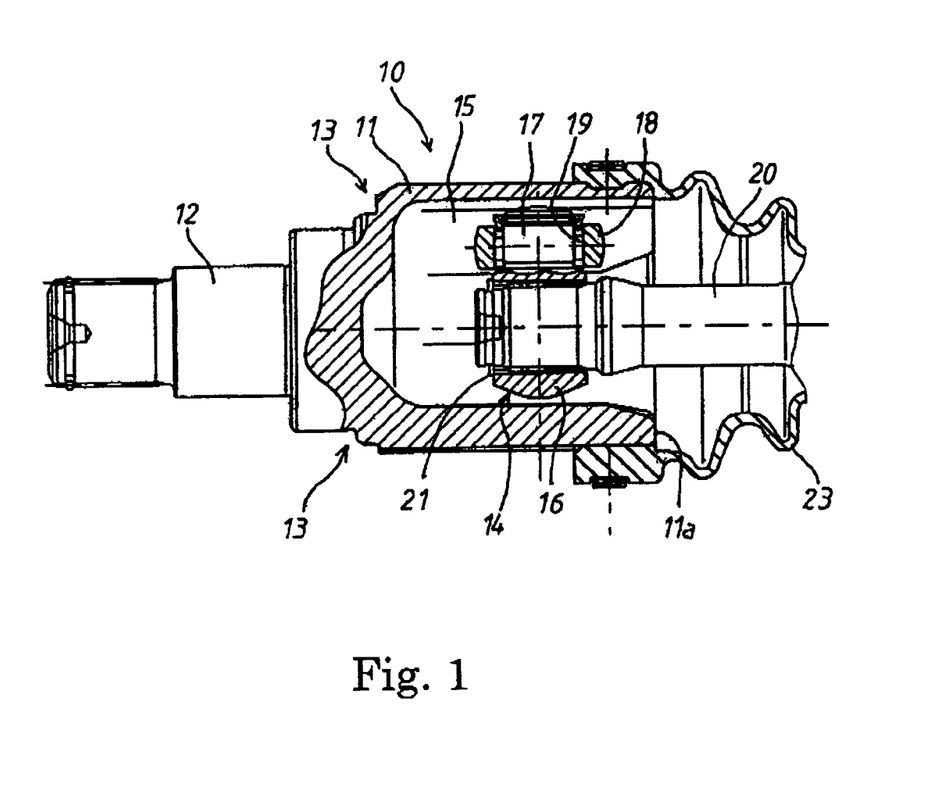
FIG. 1 is a longitudinal section view of a tripod type constant velocity joint of first embodiment related to the invention.
Figure 2:
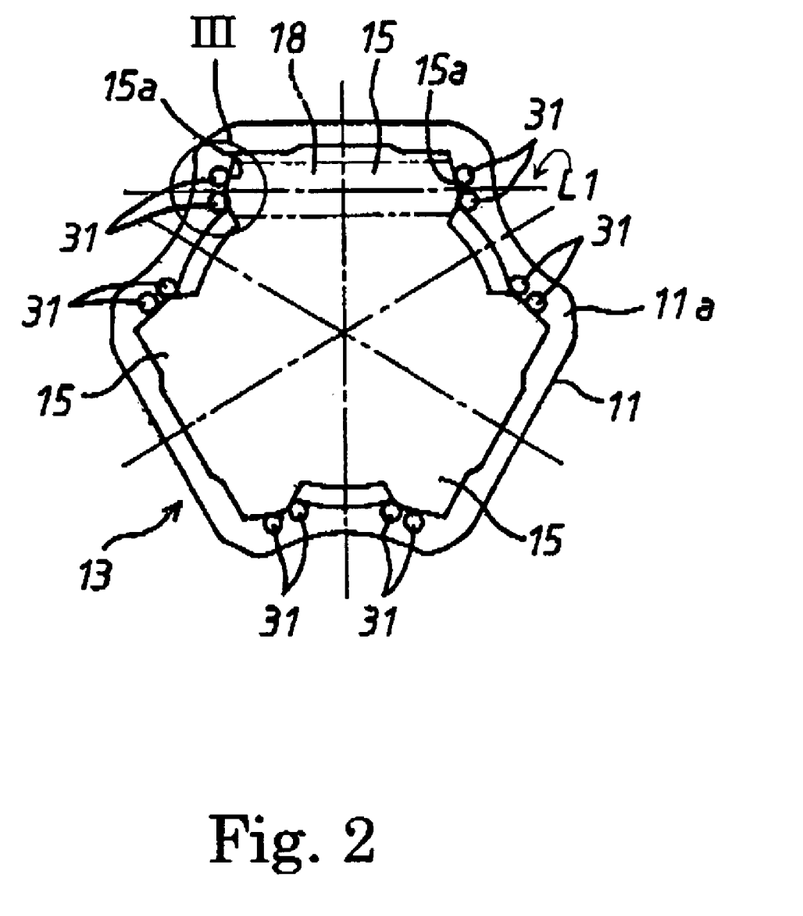
FIG. 2 shows an opening end of an outer race of the tripod type constant velocity joint.

Embodiments related to the present invention will be described with reference to figures. FIGS. 1 and 2 show a tripod type constant velocity joint 10 of a first embodiment. The tripod type constant velocity joint 10 comprises an outer race 13 and an inner race 14. The outer race 13 forms a cylindrical hollow part 11 having an opening at one end and a shaft part 12 integrally molded with the cylindrical hollow part 11 at the opposite end. In the cylindrical hollow part 11, there are circumferentially formed three tracks 15 predetermined in length parallel to the rotational axis of the outer race 13 in angular equidistance. The cylindrical hollow part 11 approximately forms the same thickness in its whole circumference, the thickness is thin, and its outline is an approximate hexagon. The inner race 14 is disposed in the cylindrical hollow part 11 of the outer race 13. The inner race 14 has a boss 16 of which three trunnions 17 are radially projected.

Reference 18 indicates three rollers as torque transmitting elements. Each of the rollers 18 is supported on each trunnion 17 via needles 19 so as to be able to rotate about the trunnion 17 and to move along the trunnion 17. The inner race 14 and the rollers 18 make up an assembly. Each of the rollers 18 is disposed in each track 15 so as to be able to roll in the track 15 along the rotational axis of the outer race 13. A drive shaft 20 is spline-connected with the boss 16 and is secured by a snap ring 21.

Each track 15 has a pair of walls 15a which form circular arc concaves facing each other in section and extend along the rotational axis of the outer race 13 in parallel. The circumferential surface of each roller 18 is convex corresponding to each wall 15a and forms a combination of two circular arcs in order to contact the wall 15a with two points. Engaging with each track 15, each roller 18 rolls on each pair of the wall 15a along the rotational axis of the outer race 13. Therefore, the inner race 14 is allowed to move angularly and longitudinally in the cylindrical hollow part 11 of the outer race 13.

Reference 23 indicates a bellows-like boot in order to cover the space between the outer race 13 and the drive shaft 20. The boot 23 is attached to the outer surface around the opening of the outer race 13 at one end and is attached to the outer surface of the drive shaft 20 at the other end.

Figure 3:
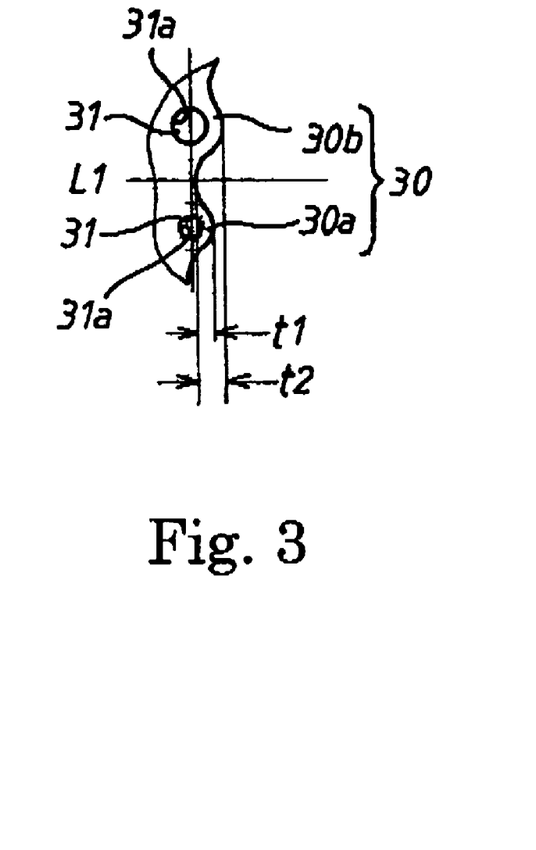
FIG. 3 is a partial magnified view of a portion indicated by III in FIG. 2.

Next, there will be described a restriction that prevents the rollers 18 from being released from the cylindrical hollow part 11 of the outer race 13. As shown in FIGS. 2 and 3, at the end surface 11a corresponding to each track 15 of the cylindrical part 11 of the outer race 13, a pair of projections 30 is plastically deformed by driving a pair of pins 31 slightly. Specifically, at the both sides of a center line L1 which is right-angled with the rotational axis of each roller 18 and which joins the centers of each pair of the walls 15a facing each other, the pins 31 whose tip is tapered are driven along the rotational axis of the outer race 13 in parallel, thereby a pair of projections 30 is slightly raised up from each wall 15a inwardly. A pair of pins 31 is used for each wall 15a, namely four pins 31 are used for each of the track 15, so that twelve pins 31 in total arranged in a jig (not shown) are simultaneously driven to the end surface 11a beside the walls 15a after locating the outer race 13 on the jig. The pin-stroke of each pin 31 is one millimeter or the less so that the pins 31 are easily driven without large load of press-fit. In this case, the position of each pair of tapered pins 31 is predetermined where the pin-stroke of the inner pin 31 is smaller than that of the outer pin 31. Therefore, the height t1 of each inner projection 30a is smaller than the height t2 of each outer projection 30b at the opening end of the cylindrical hollow part 11. It is preferable that the height t2 is 0.3-0.6 millimeter and the height t1 is 0.05-0.1 millimeter smaller than the height t2 approximately. Where the rollers 18 are press-fitted into the outer race 13, the rollers 18 inwardly moves because the more inward part of the outer race 13 tends to be more elastically deformed. In addition, the height t1 of each inner projection 30a is smaller than the height t2 of each outer projection 30b. Therefore, the height t1 for press-fitting is able to be set smaller in advance in direction that each roller 18 tends to move. That avoids/reduces adhesion between the rollers 18 and the outer race 13.

According to the restriction of the tripod type constant velocity joint 10 hereinbefore, before the inner race 14 is arranged into the cylindrical hollow part 11 of the outer race 13, the outer race 13 is set at the position where the pins 31 are driven. The tapered pins 31 are driven to the end surface 11a of the cylindrical part 11 by using the jig (not shown) which controls each pin-stroke individually at the position on the end surface 11a where each two spots sandwiches the central line L1 connecting two centers of each pair of the walls 15a of each track 15. The pin-stroke is shorter at each inner spot, internal of each central line L1, than at each outer spot so that each inner projection 30a is deformed on the track 15 to be smaller than each outer projection 30b.

After the pins 31 have been driven to the end surface 11a of the cylindrical part 11 and the jig retracts, bores 31a remain where the pins have pulled out. Next, the outer race 13 is removed from the pin-drive position and is set at the position where the inner race 14 is arranged into. The inner race 14 spline-connected with the drive shaft 20 is press-fitted into the outer race 13 from the opening of the cylindrical part 11. As a result, each roller 18 of the inner race 14 is inserted into each track 15 with elastically deforming the projections 30 at the end surface 11a on each track 15. In the first embodiment, because the height t1 of each inner projection 30a is deformed to be smaller than the height t2 of each outer projection 30b, the adhesion of the rollers 18 is avoided or reduced when the assembly (the inner race 14 and the rollers 18) is inserted.

After each roller 18 has passed through the projections 30, the projections 30 and the opening of the cylindrical part 11 elastically return. Therefore, the projections 30 avoid releasing each roller 18 from each track 15 so that the outer and the inner races 13 and 14 are prevented from dismantlement. On the other hand, even after having assembled the tripod type constant velocity joint 10, where the inner race 14 is pulled with enough tensile force for elastically deforming the opening (projections 30) of the cylindrical part 11, the outer and inner races 13 and 14 are able to be dismantled without any damage.

Figure 4:
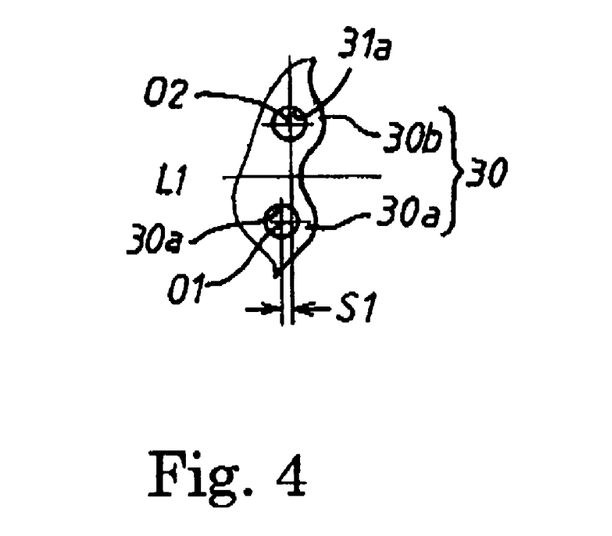
FIG. 4 is a partial magnified view of an opening end of second embodiment related to the invention.

Second embodiment will be described with reference to FIG. 4, but the same things to the first embodiment will be numbering the same and be omitted the description. In the second embodiment, another way is used for setting the difference between the height t1 of each inner projection 30a and the height t2 of each outer projection 30b. Although in the first embodiment the pin-stroke for each inner projection 30a is shorter so that each inner height ti is smaller, in the second embodiment the pins 31 are driven to the positions where the center O1 for each inner projection 30a is retracted with respect to the center O2 for each outer projection 30b for a little distance S1 along the central line L1. Therefore, even if the pin-stroke for each inner and outer projections 30 is the same, the height t1 of each inner projection 30a becomes smaller than the height t2 of each outer projection 30b.

Figure 5A:
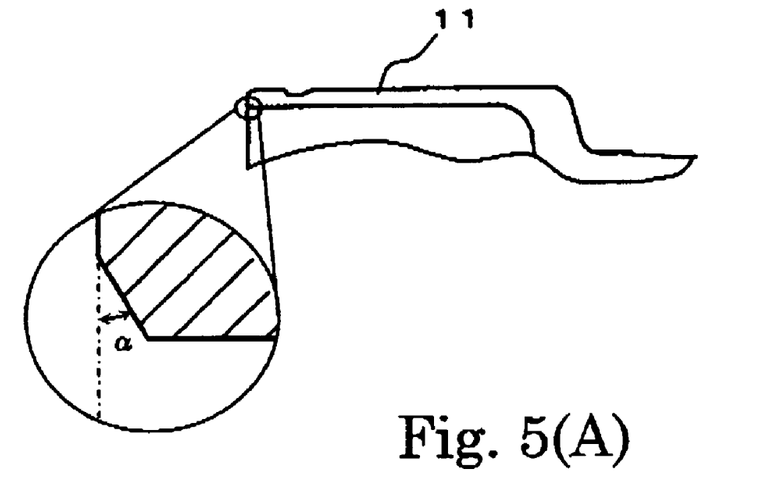
FIG. 5 shows a modification of the first and second embodiments.
Figure 5B:
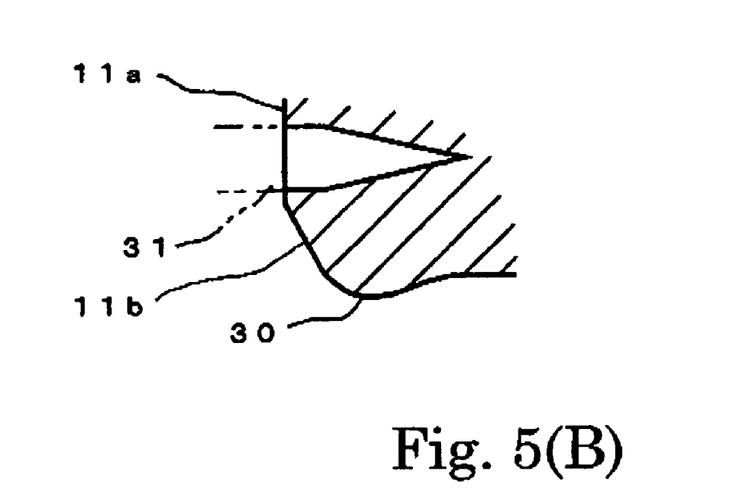

In the first and second embodiments, as shown in FIGS. 5(A) and 5(B), it is preferable that a chamfer 11b is formed at the end surface 11a of the cylindrical part 11 internally. The chamfer 11b makes contact load be fewer between the rollers 18 and the projections 30 during press-fitting the rollers 18, thereby the rollers 18 and the outer race 13 are prevented from adhesion. Although the chamfer 11b is able to be formed after/before driving pins 31, where the chamfer 11b is machined (FIG. 5(A)) before the pins 31 are driven, the projections 30 are easily formed. Preferably, the angle a of the chamfer 11b is 35 degrees or smaller. The reason is that the adhesion might occur if the angle a would be larger than 35 degrees, because slide distance would become longer between the rollers 18 and the outer race 13 during the press-fitting.

In addition, it is preferable that a lubrication basin is formed on the chamfer 11b. Where lubricant is pasted in the lubrication basin before the press-fitting, friction is reduced when the press-fitting so that the risk of the adhesion is further reduced between the rollers 18 and the outer race 13. The lubricant basin is able to be formed by plural ways. For example, the lubricant basin would be one or more grooves machined on the chamfer 11b, would be a roughness of the surface of the chamfer 11b, and would be made from forging the chamfer 11b. Or instead of the lubricant basin, the same effect would be earned by a lubricant coating such as one bonded on the chamfer 11b.

Figure 6:
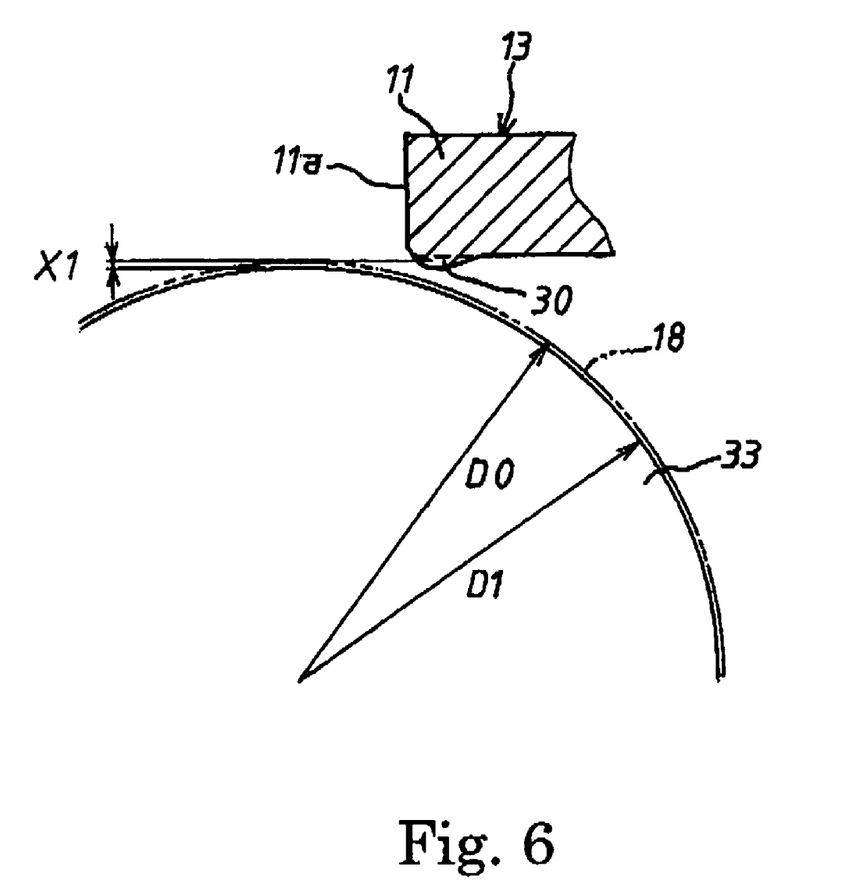
FIG. 6 shows a manufacturing method of a tripod type constant velocity joint of third embodiment related to the invention.

Next, a manufacturing method of a constant velocity joint of the present invention will be described with reference to FIG. 6 as a third embodiment. In the third embodiment, similar to the first embodiment hereinbefore, the projections 30 are deformed by driving the pins 31 to the end surface 11a of the cylindrical hollow part 11. Adding to the first embodiment, however, the third embodiment lets the height of each projection 30 uniform so as to reduce the load in order to press-fit the rollers 18.

Where the jig is located at the position to drive the pins 31 to the end surface 11a of the cylindrical part 11, it may be hard to control each of the heights t1 and t2 to be uniformed, because of an error of the jig position or the shape of the outer race 13 in tolerance. In the third embodiment, as shown in FIG. 6, there is used a roller jig 33 whose sectional shape is the same to each roller 18 but whose diameter D1 is a little smaller than the diameter D0 of each roller 18. After the pins 31 have been driven to the end surface 11a of the cylindrical part 11, the roller jig 33 is press-fitted into the tracks 15 of the cylindrical part 11 so that the roller jig 33 deforms and removes the surplus height from each projection 30. In this case, even if the adhesion might occur to the roller jig 33, that would be no problem.

According to the third embodiment, even if the height of each projection 30 might have been unequally deformed by the pin-drive, the roller jig 33 is able to equally deform the height of each projection 30 whose part for press-fitting becomes X1 or smaller. Therefore, the press-fitting force is reduced so that the adhesion of the rollers 18 are avoided or reduced. Although the roller jig 33 is explained hereinbefore, the jig 33 is able to form the other shape whose width is a little smaller than the diameter D0 of each roller 18.

Figure 7:
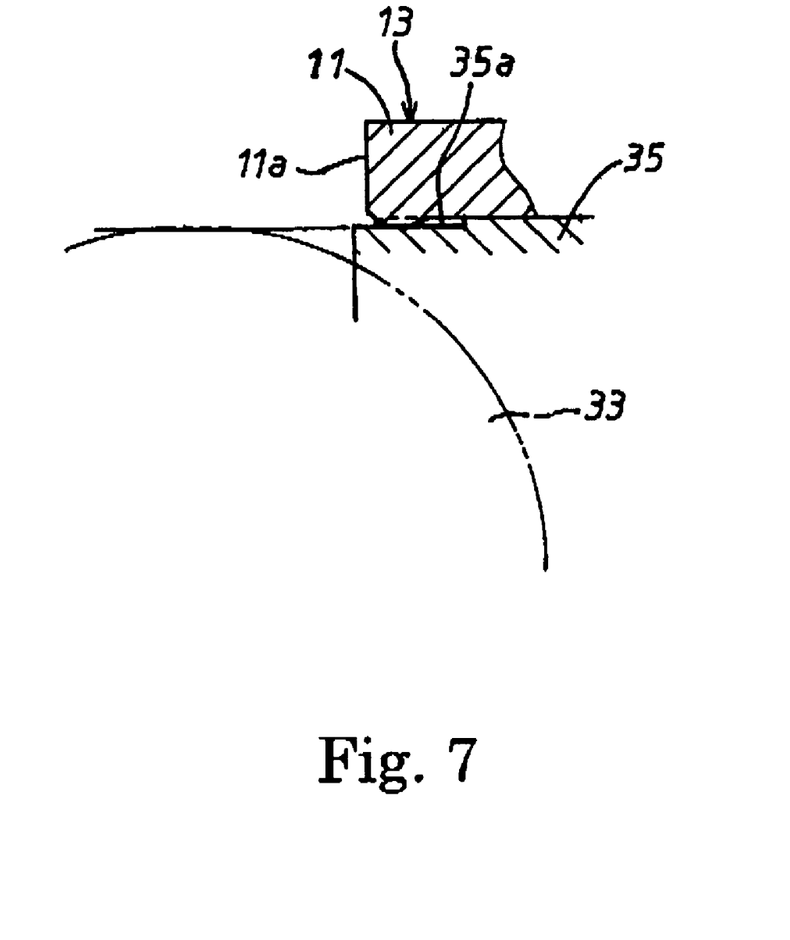
FIG. 7 shows a manufacturing method of a tripod type constant velocity joint of forth embodiment related to the invention.

FIG. 7 shows fourth embodiment of the present invention which modifies the third embodiment. In the fourth embodiment, the height of each projection 30 is able to be formed equally without the process of the roller jig 33 of the third embodiment after the pin-drive. Instead of the roller jig 33 of the third embodiment, the fourth embodiment uses three projection control elements 35. Each projection control element 35 has a pair of projection control surfaces 35a which forms a concave corresponding to the projections 30. Where each projection control element 35 is fitted into each track 15 of the cylindrical part 11 of the outer race 13, the pins are driven to the end surface 11a of the cylindrical part 11 so as to control the height of each projection 30.

Figure 8:
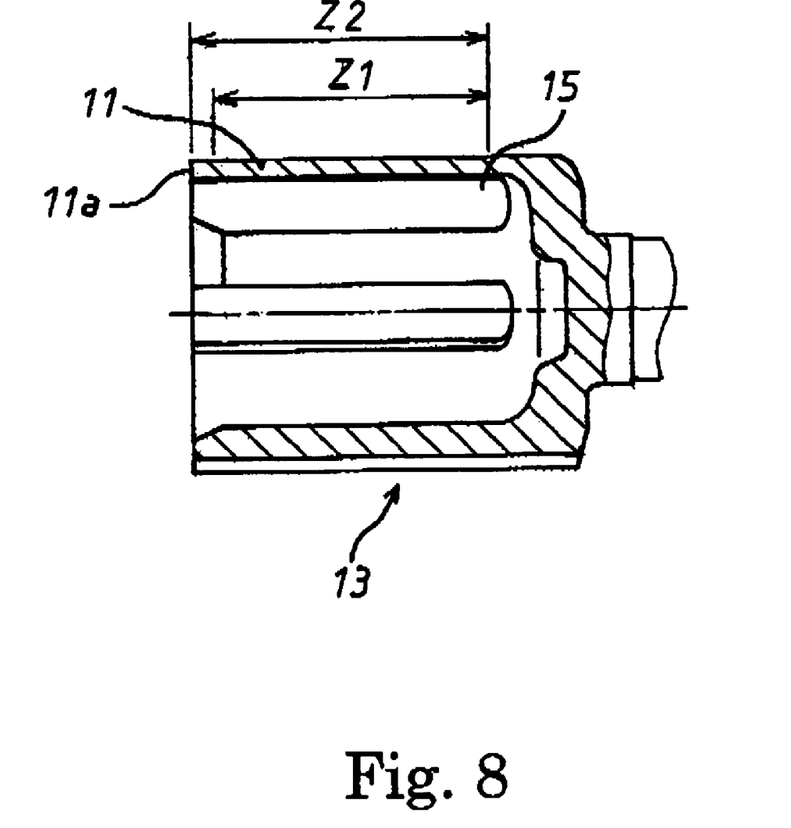
FIG. 8 shows a manufacturing method of a tripod type constant velocity joint of fifth embodiment related to the invention.

FIG. 8 shows fifth embodiment. In general, although the rollers 18 are hardened by quenching, the opening (around the end surface 11a) of the outer race 13 is not quenched. The adhesion may occur from hardness difference between the rollers 18 and the end surface 11a of the cylindrical part 11. In the fifth embodiment, there is no or less hardness difference between the outer race 13 and rollers 18 so as to avoid/reduce the adhesion of the rollers 18.

In the tripod type constant velocity joint 10, as shown in FIG. 8, there is quenched over a quenching range Z1 of the outer race 13 except opening (around the end surface 11a) in order to prevent the opening from quenching crack. Additionally, because of no quenching around the opening where the pins 31 are driven, wear and deformation of the pins 31 are reduced so as to increase durability of the pins 31. After driving the pins 31 and before press-fitting the rollers 18, further quenching takes place over an extended quenching range Z2 so that the projections 30 are quenched. It is preferable that hardness of the projections 33 is 300 Hv or more. As explained above, the opening is not quenched when driving the pins 31, so that the wear and deformation of the pins 31 are reduced and the opening is prevented from the quenching crack. In addition, the projections 30 deformed by the pin-drive is quenched when press-fitting the rollers 18, so that the projections 30 are hardened as the same level as the rollers 18 and there is reduced the risk of the adhesion proceeding from the hardness difference between the rollers 18 and the projections 30.

Figure 9:
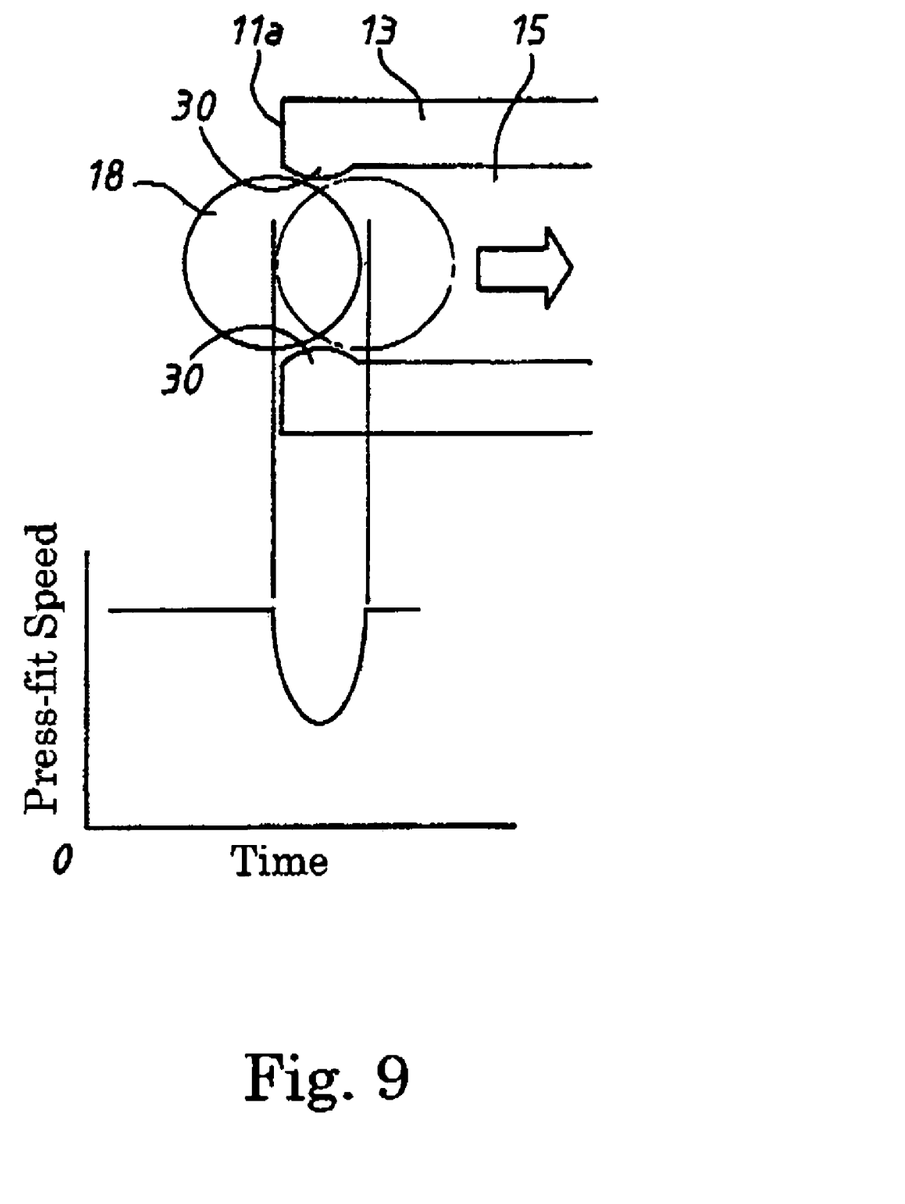
FIG. 9 shows a manufacturing method of a tripod type constant velocity joint of sixth embodiment related to the invention.

With reference to FIG. 9, there will be described sixth embodiment related to a manufacturing method of the constant velocity joint of the present invention. In the sixth embodiment, press-fit speed of the rollers 13 is controlled in shape of step as shown in FIG. 9 in order to reduce press-fit time, thereby heat is reduced and the adhesion of the rollers 18 is avoided or reduced when press-fitting the rollers 18.

Although increasing the press-fit speed of the rollers 18 lets the press-fit time shorten, the rollers 18 tend to be unstable and to be inclined so as to heat up and to easily occur the adhesion until the three rollers 18 have been adapted to the tracks 15 of the outer race 13. In the sixth embodiment, with observing press-fit load of the rollers 18, the press-fit speed is controlled as shown by a diagram in FIG. 9. Namely, the rollers 18 rapidly moves until reaching the projections 30, and slow down its press-fit speed until the assembly (the inner race 14 and the rollers 18) has been adapted to the projections 30 of the track 15. Therefore, the heat is controlled under predetermined level so as to reduce the risk of the adhesion of the rollers 18 proceeding from the heat without increasing the press-fit time.

Figure 10:
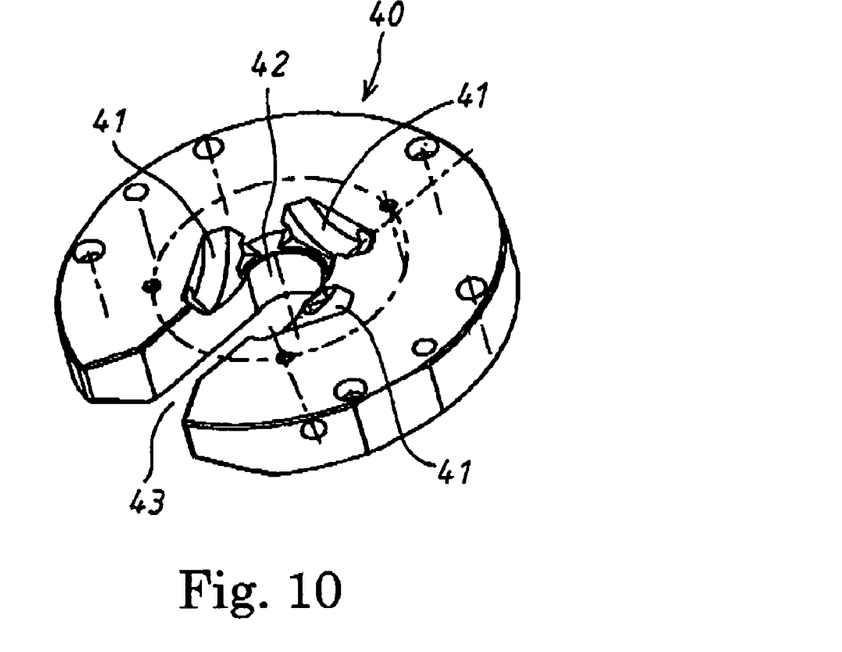
FIG. 10 shows a jig for assembling a tripod type constant velocity joint of seventh embodiment related to the invention.

With reference to FIG. 10, there will be described seventh embodiment related to a jig for assembling the constant velocity joint of the present invention. The jig 40 for assembling the constant velocity joint 10 forms disk-like whose face has three engaging portions 41 in angular equidistance corresponding to the position and shape of each roller 18. Additionally, there exist a center bore 42 at the center of the jig 40 and a cutaway 43 which opens the center bore 42 radially. The diameter of the center bore 42 and the width of the cutaway 43 are larger than the diameter of the drive shaft 20, thereby the drive shaft 20 penetrates through the jig 40 where each roller 18 is set in each engaging portion 41. The engaging portions 41 respectively hold the rollers 18 in themselves not to incline the rollers 18 during press-fitting. And on the surface of each engaging portion 41, there is pasted rubber, resin or etc. to prevent each roller 18 from rotation occurred from slip.

In the third to seventh embodiments, although avoiding or reducing the adhesion is a common to the first and second embodiments, the inner and outer projections 30a and 30b may have the same height.

Figure 11:
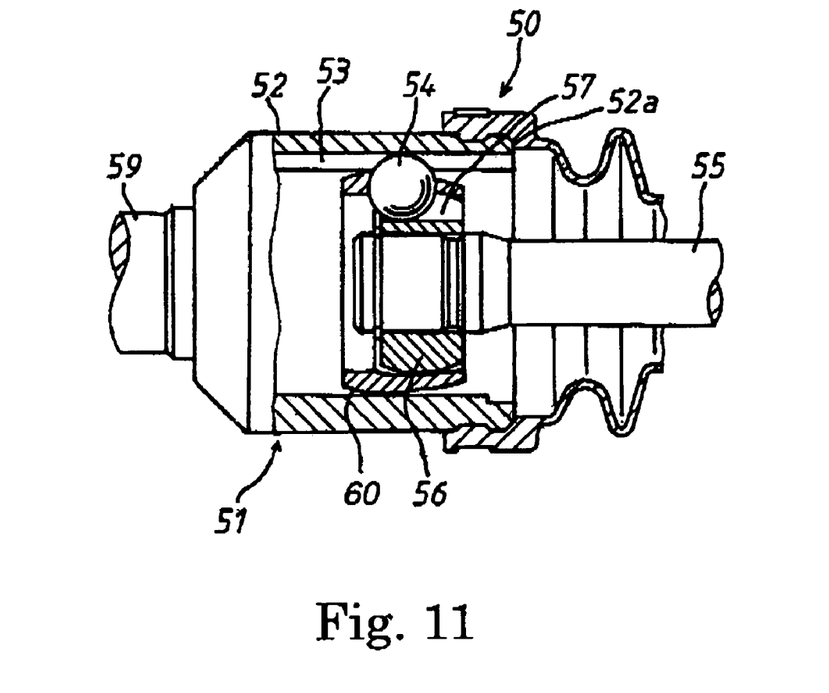
FIG. 11 is a longitudinal section view of a double offset type constant velocity joint of eighth embodiment related to the invention; and, FIG. 12 shows an opening end of an outer race of the double offset type constant velocity joint.
Figure 12:
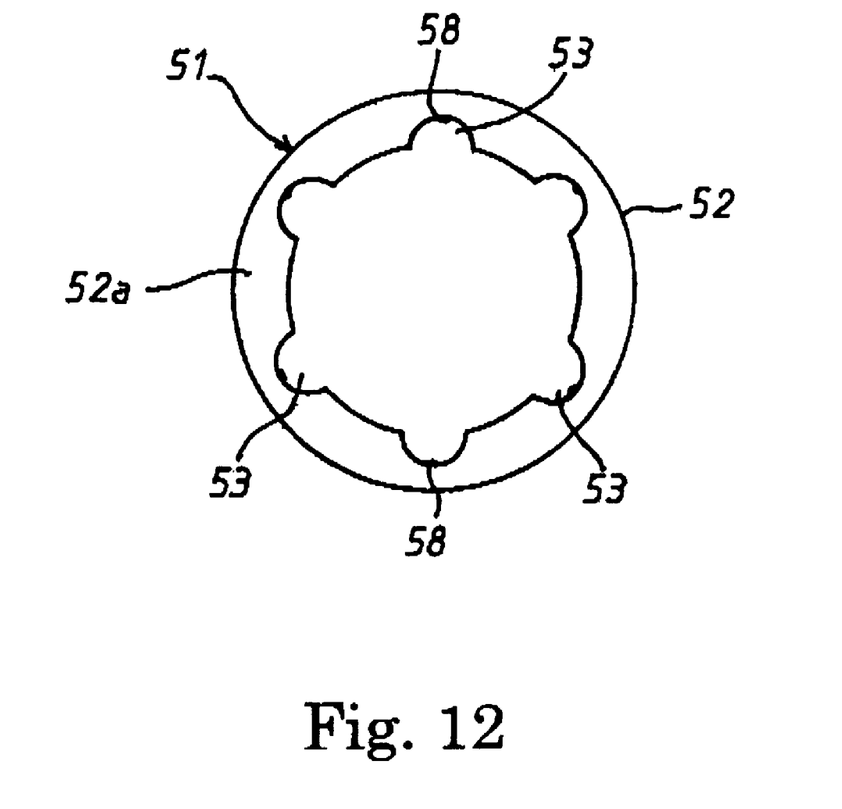

Eighth embodiment will be described with reference to FIGS. 11 and 12. Although the first to seventh embodiments are applied to the tripod type constant velocity joint 10, the eighth embodiment is applied to a double offset type constant velocity joint 50. In the double offset type constant velocity joint 50, an outer race 51 includes a shaft part 59 and a cylindrical hollow part 52 whose inner surface has six tracks 53 extending axially in angular equidistance. An inner race 56 is connected with a drive shaft 55 and has six ball grooves 57 extending axially in angular equidistance. In each track 53 and each ball groove 57, a ball 54 is fitted rotatably and slidably. In addition, the circumstance of the inner race 56 is spherical and is fitted into a cage 60 which holds the balls 54.

A pin is driven by a jig (not shown) to an end surface 52a of the cylindrical hollow part 52 corresponding to a bottom of each track 53, so as to form a projection 58 swelling up from the bottom of each track 53 inwardly around the end surface 52a. The pin-drive precisely provides a small height of each projection 58 for restriction of release without a large force. On the other hand, after assembling the constant velocity joint 50, because the opening of the cylindrical part 52 is elastically deformed, pulling the inner race 56 out from the outer race 51 provides a dismantle without a damage of the inner race 56 and the outer race 51. Moreover, the pin-drive provides a small deformation of each projection 58 so that the projections 58 would not chip off during the pin-drive. The projections 58 are applicable to not only all tracks 58 but also alternate tracks 53. In the double offset type constant velocity joint 50 of the eighth embodiment, the balls 54 correspond to torque transmitting elements, and the inner race 56, the balls 54 and the cage 60 make up an assembly.

Obviously, numerous modifications and variations of the present invention are possible in light of the above teachings. It is thereby to be understood that within the scope of the appended claims, the present invention may be practiced otherwise than as specifically described herein.

What is claimed is:

1. A constant velocity joint comprising:
   an outer race having a cylindrical hollow part whose one end opens at an end edge surface and whose inner surface has plural tracks;
   an inner race disposed in the outer race to move angularly and longitudinally;
   plural torque transmitting elements disposed between the outer and inner races; projections plastically formed in the tracks at the opening end of the cylindrical hollow part; and
   bores provided by driving a pin in the end edge surface of the cylindrical hollow part at circumferential locations of the end edge surface of the cylindrical hollow part corresponding to the circumferential locations of the projections.

2. A constant velocity joint according to claim 1, wherein:
   each of the tracks comprises two substantially radially extending walls; and
   each of the walls has a pair of the projections, wherein the one of the projections is located radially inner on the respective wall and the other of the projections is located radially outer on the respective wall;
   wherein the height of the inner projection is smaller than that of the outer projection.

3. A constant velocity joint according to claim 2, wherein:
   the depth of the bore at the location of the inner projection is smaller than that at the location of the outer projection.

4. A constant velocity joint according to claim 2, wherein:
   the center of the bore at the location of the inner projection is set farther apart from the central line of each of the torque transmitting elements than that at the location of the outer projection.

5. A constant velocity joint according to claim 1, wherein:
   a chamfer is formed at the opening end of the cylindrical hollow part.

6. A constant velocity joint according to claim 5, wherein:
   the angle of the chamfer is 35 degrees or less.

\* \* \* \* \*